United States Patent
Fukuta

(10) Patent No.: US 11,407,379 B2
(45) Date of Patent: Aug. 9, 2022

(54) VEHICLE OCCUPANT RESTRAINT SYSTEM

(71) Applicant: Toyota Jidosha Kabushiki Kaisha, Toyota (JP)

(72) Inventor: Kenji Fukuta, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/928,582

(22) Filed: Jul. 14, 2020

(65) Prior Publication Data

US 2021/0101561 A1 Apr. 8, 2021

(30) Foreign Application Priority Data

Oct. 7, 2019 (JP) .............................. JP2019-184675

(51) Int. Cl.
*B60R 22/40* (2006.01)
*B60R 22/46* (2006.01)
*B60R 21/013* (2006.01)

(52) U.S. Cl.
CPC ............ *B60R 22/40* (2013.01); *B60R 21/013* (2013.01); *B60R 22/46* (2013.01); *B60R 2022/4666* (2013.01)

(58) Field of Classification Search
CPC ..... B60R 22/40; B60R 21/013; B60R 22/343; B60R 22/46; B60R 2022/4666;
(Continued)

(56) References Cited

U.S. PATENT DOCUMENTS 6,394,495 B1 5/2002 Specht
6,758,495 B2 * 7/2004 Brambilla ........... B60R 21/0132
                                                      180/268
(Continued)

FOREIGN PATENT DOCUMENTS

CN        1603183 A      4/2005
CN      101233019 A      7/2008
(Continued)

OTHER PUBLICATIONS

Office Action Issued to U.S. Appl. No. 16/598,395 dated Mar. 8, 2021.
(Continued)

*Primary Examiner* — Laura Freedman
(74) *Attorney, Agent, or Firm* — Dinsmore & Shohl LLP

(57) ABSTRACT

A vehicle occupant restraint system is configured to, when a vehicle speed is higher than or equal to a vehicle speed threshold, a steering angle velocity is higher than or equal to a steering angle velocity threshold set for each vehicle speed, and an estimated lateral acceleration is higher than or equal to an acceleration threshold, drive a retractor motor. The steering angle velocity threshold is as a condition to drive the retractor motor. Therefore, by setting an appropriate steering angle velocity threshold according to an amount of movement of an occupant with inertia in a vehicle width direction, the vehicle occupant restraint system is able to take up a webbing when the occupant is estimated to move with inertia by a relatively large amount in the vehicle width direction. The amount of movement with inertia varies for each vehicle speed even at the same steering angle velocity.

6 Claims, 11 Drawing Sheets

(58) Field of Classification Search
CPC ............... B60R 21/01; B60R 21/0132; B60R 2021/01013; B60R 2021/01265; B60R 2021/01272; B60R 2021/01322; B60R 2021/01327
See application file for complete search history.

(56) References Cited

U.S. PATENT DOCUMENTS

| | | | |
|---|---|---|---|
| 6,766,875 B2 | 7/2004 | Yamamoto | |
| 7,493,204 B2* | 2/2009 | Yano | B60R 21/0132 180/271 |
| 7,499,779 B2* | 3/2009 | Geborek | B60R 21/0133 701/38 |
| 7,564,343 B2* | 7/2009 | Ohmura | B60R 21/0132 340/436 |
| 7,664,585 B2* | 2/2010 | Odate | B60R 22/46 701/45 |
| 7,912,609 B2* | 3/2011 | Beisheim | B60R 21/013 701/45 |
| 7,987,031 B2* | 7/2011 | Diebold | B60R 21/0132 701/45 |
| 7,992,669 B2* | 8/2011 | Odate | B60R 22/46 180/268 |
| 8,090,505 B2 | 1/2012 | Takemura | |
| 8,818,642 B2 | 8/2014 | Bunker | |
| 9,275,008 B2 | 3/2016 | Bunker | |
| 9,346,465 B2 | 5/2016 | Bunker | |
| 10,723,353 B2* | 7/2020 | Takeuchi | B60W 30/0953 |
| 10,759,369 B2* | 9/2020 | Jang | B62D 15/021 |
| 11,007,914 B2* | 5/2021 | Ohno | B60N 2/4228 |
| 11,198,414 B2* | 12/2021 | Nezaki | B60R 21/0132 |
| 2001/0025735 A1* | 10/2001 | Midorikawa | B60R 22/46 180/268 |
| 2003/0114973 A1 | 6/2003 | Takagi et al. | |
| 2004/0080204 A1 | 4/2004 | Enomoto et al. | |
| 2005/0099065 A1 | 5/2005 | Harada et al. | |
| 2007/0228713 A1 | 10/2007 | Takemura | |
| 2008/0023246 A1 | 1/2008 | Gillet | |
| 2008/0033616 A1 | 2/2008 | Gillet | |
| 2008/0300753 A1 | 12/2008 | Bauer et al. | |
| 2008/0319617 A1* | 12/2008 | Takemura | B60R 21/0132 701/45 |
| 2009/0150028 A1* | 6/2009 | Bernzen | B60R 21/0132 701/45 |
| 2009/0174174 A1 | 7/2009 | McCoy | |
| 2013/0079997 A1 | 3/2013 | Bunker | |
| 2018/0354455 A1* | 12/2018 | Umakoshi | B60R 21/0132 |
| 2019/0176736 A1* | 6/2019 | Jang | B60R 22/48 |
| 2019/0184926 A1* | 6/2019 | Jang | B60W 50/0098 |
| 2020/0114853 A1* | 4/2020 | Nezaki | B60R 21/0134 |
| 2020/0114866 A1 | 4/2020 | Nezaki et al. | |
| 2020/0130642 A1* | 4/2020 | Nezaki | B60R 21/013 |
| 2021/0107429 A1* | 4/2021 | Fukuta | B60R 22/48 |

FOREIGN PATENT DOCUMENTS

| | | | | |
|---|---|---|---|---|
| CN | 102548831 A | | 7/2012 | |
| CN | 102730001 A | | 10/2012 | |
| EP | 0728624 A2 | * | 8/1996 | ........... B60R 21/013 |
| EP | 2505434 A2 | | 10/2012 | |
| EP | 2505435 A2 | | 10/2012 | |
| JP | 2004-074957 A | | 3/2004 | |
| JP | 2007001423 A | * | 1/2007 | |
| JP | 2007-27654 A | | 2/2007 | |
| JP | 2007-237915 A | | 9/2007 | |
| JP | 2007276540 A | | 10/2007 | |
| JP | 2008-535723 A | | 9/2008 | |
| JP | 2013-159191 A | | 8/2013 | |
| JP | 2020-063033 A | | 4/2020 | |
| WO | 2006107251 A1 | | 10/2006 | |
| WO | 2011/055794 A1 | | 5/2011 | |

OTHER PUBLICATIONS

Office Action Issued to EP Application No. 19201727.5 dated Sep. 4, 2020.
Notice of Allowance issued to U.S. Appl. No. 16/598,395 dated Oct. 15, 2021.
Notice of Allowance issued to U.S. Appl. No. 16/598,395 dated Jul. 12, 2021.
Corrected Notice of Allowability issued to U.S. Appl. No. 16/598,395 dated Nov. 15, 2021.

* cited by examiner ll # VEHICLE OCCUPANT RESTRAINT SYSTEM

CROSS-REFERENCE TO RELATED APPLICATIONS

The disclosure of Japanese Patent Application No. 2019-184675 filed on Oct. 7, 2019 including the specification, drawings and abstract is incorporated herein by reference in its entirety.

BACKGROUND

1. Technical Field

The disclosure relates to a vehicle occupant restraint system.

2. Description of Related Art

Japanese Unexamined Patent Application Publication No. 2007-276540 (JP 2007-276540 A) describes a seatbelt system that is able to retract a webbing by driving a motor. In JP 2007-276540 A, the seatbelt system is configured to drive the motor when a steering angle, a steering angle velocity, and a steering angle acceleration respectively satisfy predetermined thresholds. On the other hand, Japanese Unexamined Patent Application Publication No. 2008-535723 (JP 2008-535723 A) describes a system configured to increase the tension of a webbing when the rate of change in steering angle (steering angle velocity) exceeds a threshold. Furthermore, Japanese Unexamined Patent Application Publication No. 2007-237915 (JP 2007-237915 A) describes a system including a turn controller configured to stabilize a running condition while a vehicle is turning. The system is configured to, when a predetermined time elapses after activation of the turn controller, retract a webbing by driving a motor.

SUMMARY

However, depending on a vehicle speed, a high lateral acceleration may be not applied to a vehicle even at a high steering angle velocity. In a situation in which the turn controller is activated, no high lateral acceleration is applied to a vehicle because of a slip, and an occupant may countersteer. In this case as well, when the steering angle velocity reaches the threshold, the webbing may be taken up, and it is not desirable from the viewpoint of comfort if the tension of the webbing is increased in an unnecessary situation.

The disclosure provides a vehicle occupant restraint system that is able to achieve both comfort and occupant protection performance.

An aspect of the disclosure provides a vehicle occupant restraint system. The vehicle occupant restraint system includes a seatbelt device and a controller. The seatbelt device is configured to be able to restrain an occupant seated on a vehicle seat by using a webbing of which one end is wound on a take-up device and the other end is fixed to the vehicle seat or a vehicle body. The seatbelt device is configured to be able to take up the webbing by driving a motor provided in the take-up device. The controller is configured to, when a vehicle speed is higher than or equal to a predetermined vehicle speed threshold, a steering angle velocity is higher than or equal to a predetermined steering angle velocity threshold set for each vehicle speed, and an estimated lateral acceleration estimated to be applied to a vehicle is higher than or equal to a predetermined acceleration threshold, take up the webbing by a predetermined amount by driving the motor.

With the vehicle occupant restraint system according to the aspect, one end of the webbing of the seatbelt device is wound on the take-up device, and the other end is fixed to the vehicle seat or the vehicle body. The vehicle occupant restraint system is configured to be able to restrain the occupant to the vehicle seat with the webbing. The take-up device includes the motor. The webbing is taken up by the motor being driven. Thus, even when a high acceleration is input to the vehicle, an inertial movement of the occupant is reduced by increasing the tension of the webbing.

The vehicle occupant restraint system includes the controller configured to drive the motor. The controller is configured to, when the vehicle speed is higher than or equal to the vehicle speed threshold, the steering angle velocity is higher than or equal to the steering angle velocity threshold set for each vehicle speed, and the estimated lateral acceleration is higher than or equal to the acceleration threshold, drive the motor. In other words, the steering angle velocity threshold set as a condition to drive the motor is set for each vehicle speed. Therefore, by setting an appropriate steering angle velocity threshold according to an amount of inertial movement of the occupant in a vehicle width direction, the vehicle occupant restraint system is able to take up the webbing when the occupant is estimated to move because of inertia by a relatively large amount in the vehicle width direction. The amount of inertial movement varies for each vehicle speed even at the same steering angle velocity.

In the vehicle occupant restraint system according to the above aspect, the controller may be configured to increase the steering angle velocity threshold as the vehicle speed decreases.

With the vehicle occupant restraint system according to this aspect, the steering angle velocity threshold is set so as to increase as the vehicle speed decreases, so the motor is driven at a higher steering angle velocity when the vehicle speed is low than when the vehicle speed is high. Generally, when the vehicle speed is low, an occupant is difficult to move with inertia unless the steering angle velocity increases as compared to when the vehicle speed is high, so the webbing is appropriately taken up according to the amount of inertial movement of the occupant, which varies with the vehicle speed.

In the vehicle occupant restraint system according to the above aspect, the controller may be configured to set the acceleration threshold for each vehicle speed.

With the vehicle occupant restraint system according to this aspect, the acceleration threshold is set for each vehicle speed. Therefore, by setting an appropriate acceleration threshold according to a lateral acceleration that varies with a vehicle speed even at the same steering angle, the webbing is taken up when the occupant is estimated to move because of inertia by a relatively large amount in the vehicle width direction based on a vehicle speed.

In the vehicle occupant restraint system according to the above aspect, the controller may be configured to decrease the acceleration threshold as the vehicle speed decreases.

With the vehicle occupant restraint system according to this aspect, the acceleration threshold is set so as to decrease as the vehicle speed decreases. Therefore, the acceleration threshold increases when the vehicle speed is high as compared to when the vehicle speed is low. Generally, when the vehicle speed is high, an estimated lateral acceleration increases even at a small steering angle. Therefore, when the same acceleration threshold as that when the vehicle speed is low is set, the estimated lateral acceleration may easily reach the acceleration threshold, and, as a result, the webbing may be taken up. In contrast to this, the acceleration threshold is set so as to be higher when the vehicle speed is high than when the vehicle speed is low. Therefore, immediate taking up of the webbing resulting from slight input of steering at a high vehicle speed is suppressed.

In the vehicle occupant restraint system according to the above aspect, the controller may be configured to, when a side slip is predicted or detected while the vehicle is running, change the steering angle velocity threshold and the acceleration threshold such that the steering angle velocity threshold and the acceleration threshold become higher than the steering angle velocity threshold and the acceleration threshold when no side slip of the vehicle is predicted or detected.

With the vehicle occupant restraint system according to this aspect, when a side slip of the vehicle is predicted or detected, the steering angle velocity threshold and the acceleration threshold are increased as compared to the other cases. Therefore, immediate taking up of the webbing resulting from the steering angle velocity and the estimated lateral acceleration easily reaching the steering angle velocity threshold and the acceleration threshold at the time of occupant's counter-steering because of a side slip is suppressed.

As described above, with the vehicle occupant restraint system according to the above aspect, both comfort and occupant protection performance are achieved.

With the vehicle occupant restraint system according to the above aspect, the occupant is restrained at appropriate timing according to the vehicle speed.

With the vehicle occupant restraint system according to the above aspect, the occupant is restrained at appropriate timing in the event of a side slip of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
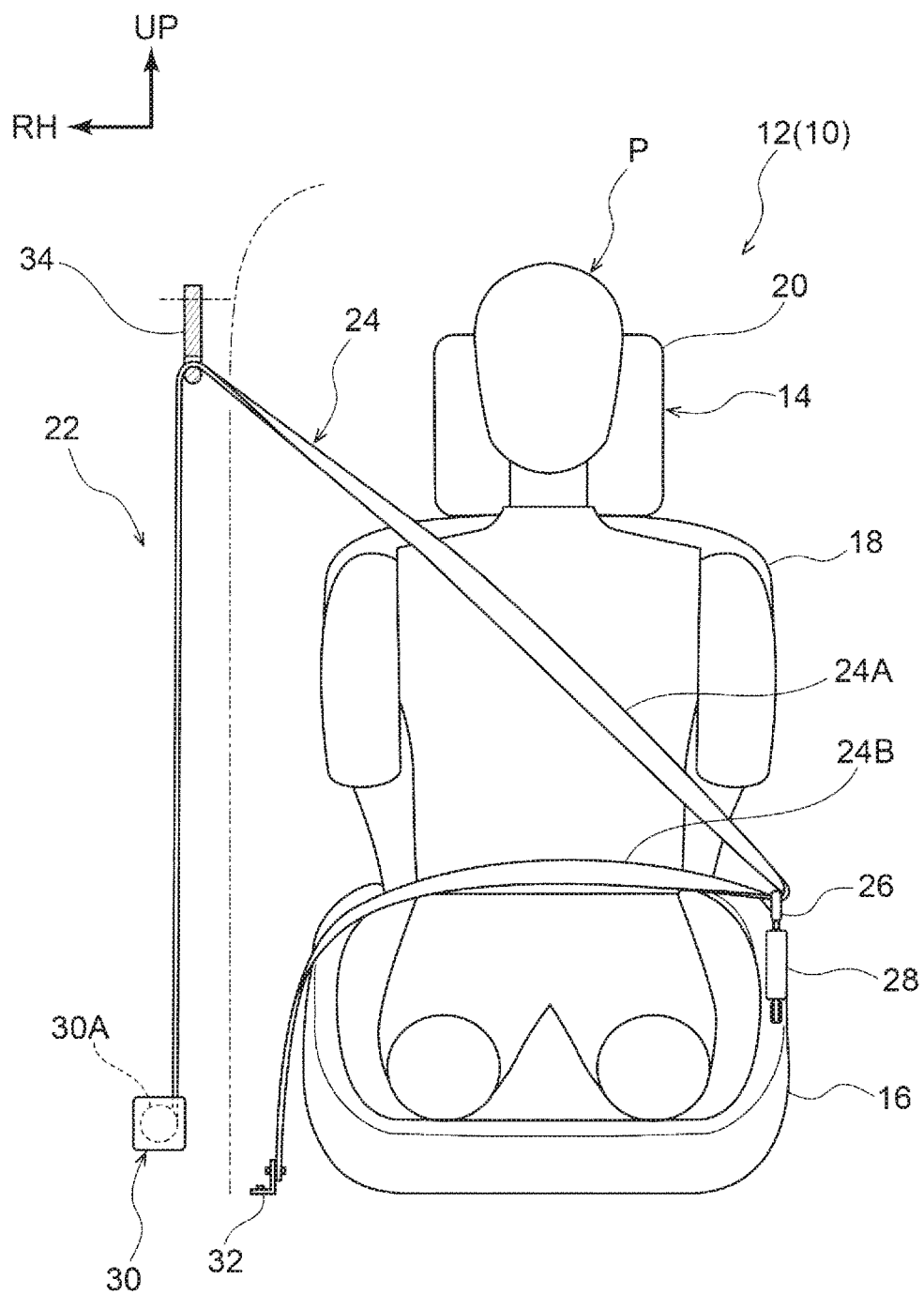
FIG. 1 is a schematic front view of a vehicle seat to which a vehicle occupant restraint system according to a first embodiment is applied when viewed from a vehicle front.

A vehicle occupant restraint system 10 according to a first embodiment will be described with reference to FIG. 1 to FIG. 8. The arrow FR, the arrow UP, and the arrow RH shown in the drawings as needed respectively indicate directions toward the front, top, and right hand of a vehicle. Hereinafter, when description will be made by simply using directions toward front and rear, top and bottom, and right hand and left hand, these directions respectively mean front and rear in a vehicle front-rear direction, top and bottom in a vehicle top-bottom direction, and right hand and left hand when facing toward the front of the vehicle unless otherwise specified.

As shown in FIG. 1, a vehicle 12 to which the vehicle occupant restraint system 10 according to the present embodiment is applied includes vehicle seats 14. Each vehicle seat 14 is made up of a seat cushion 16 and a seat back 18. The seat cushion 16 is able to support the buttocks and thighs of an occupant P from the lower side. The seat back 18 is coupled to the rear end of the seat cushion 16 and is able to support the back of the occupant P. A head rest 20 is provided at the upper end of the seat back 18. The head rest 20 is able to support the head of the occupant P.

Each vehicle seat 14 is equipped with a seatbelt device 22. The seatbelt device 22 includes a webbing 24, a tongue 26, a buckle 28, and a retractor 30 serving as a take-up device.

The webbing 24 is formed in a long band. One end of the webbing 24 is wound on a spool 30A of the retractor 30 (described later). The webbing 24 is pulled out upward from the retractor 30, routed through a belt guide 34 secured to the vehicle 12, and obliquely extended from the right shoulder of the occupant P seated on the right-side vehicle seat 14 to the left hip of the occupant P (for an occupant P seated on the left-side vehicle seat 14, from the left shoulder to the right hip).

The webbing 24 is passed through the tongue 26. The tongue 26 is engaged with the buckle 28 of the vehicle seat 14 at the position of the hip of the occupant P. The webbing 24 is folded back at the tongue 26 and extended to the seat right side, and the other end of the webbing 24 is fixed to an anchor 32 secured to the floor of the vehicle 12. Thus, the webbing 24 is able to restrain the occupant P seated on the vehicle seat 14. A part of the webbing 24, obliquely extended on the front of upper body of the occupant P, is a shoulder belt part 24A, and a part of the webbing 24, extended in the right-left direction across the hips of the occupant P, is a lap belt part 24B.

The retractor 30 includes the rotatable spool 30A inside. One end of the webbing 24 is wound on the spool 30A. The spool 30A is connected to a retractor motor (not shown). The spool 30A is rotated in a take-up direction or pull-out direction by the retractor motor being driven. Furthermore, the retractor 30 includes a pretensioner (not shown). When the pretensioner is activated in the event of a collision, or the like, of the vehicle, the spool 30A is forced to rotate in the take-up direction to increase the tension of the webbing 24.

Figure 2:
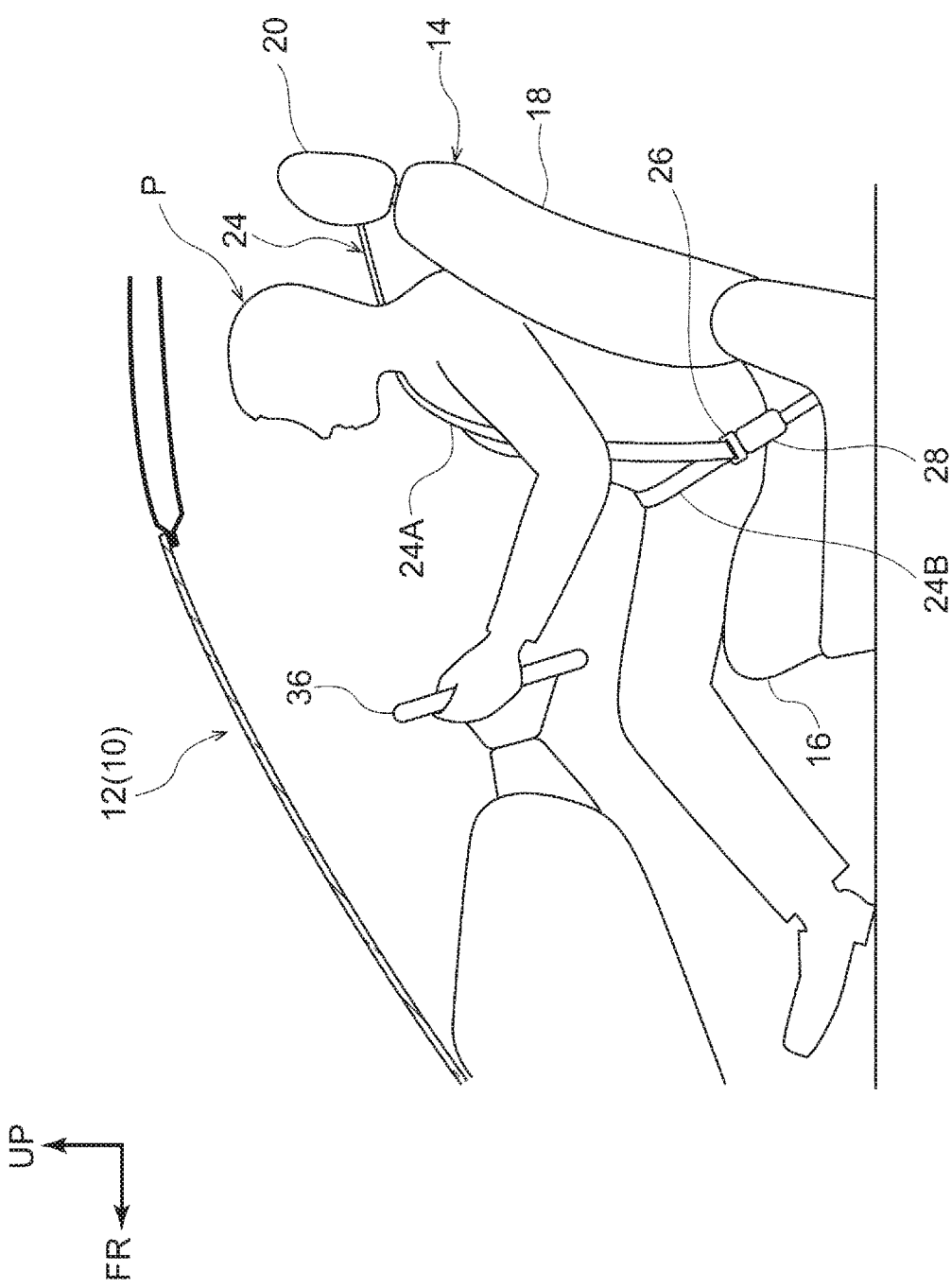
FIG. 2 is a schematic side view of a cabin of the vehicle to which the vehicle occupant restraint system according to the first embodiment is applied when viewed in a vehicle width direction.

As shown in FIG. 2, the vehicle seat 14 of the present embodiment is a seat provided as a driver seat of a right-hand drive vehicle, and a steering wheel 36 is provided in front of the vehicle seat 14. When the occupant P grips the steering wheel 36 and steers to the right or to the left, the vehicle 12 is turned to the right or to the left.

Figure 3:
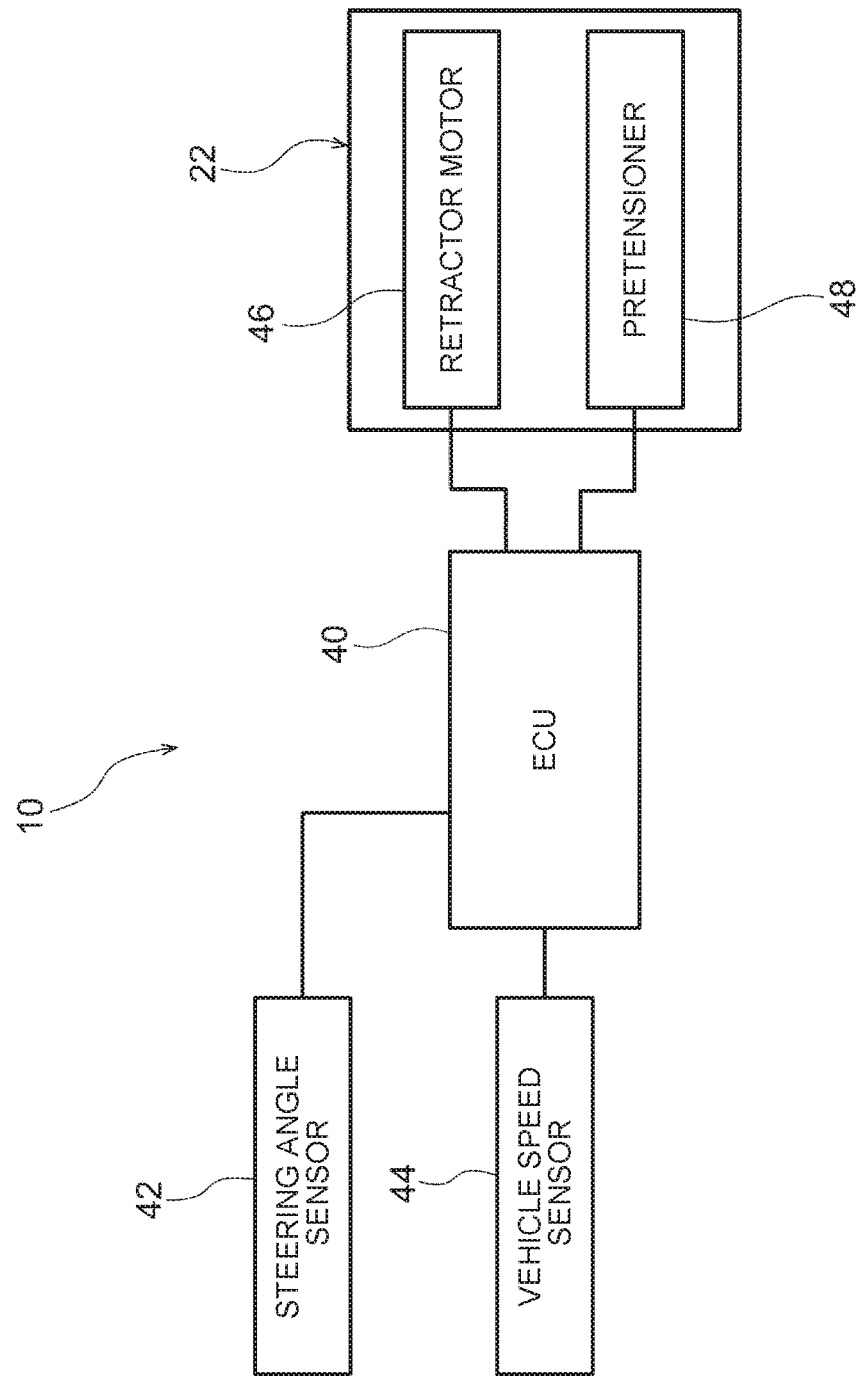
FIG. 3 is a block diagram that shows the hardware configuration of the vehicle occupant restraint system according to the first embodiment.

FIG. 3 is a block diagram that shows the hardware configuration of the vehicle occupant restraint system 10. As shown in FIG. 3, the vehicle occupant restraint system 10 includes an electrical control unit (ECU) 40 serving as a controller. The ECU 40 is electrically connected to a steering angle sensor 42, a vehicle speed sensor 44, the retractor motor 46, and the pretensioner 48.

The steering angle sensor 42 is a sensor that detects the steering angle of the steering wheel 36. The vehicle speed sensor 44 is a sensor that detects the speed of the vehicle 12. The steering angle detected by the steering angle sensor 42 and the vehicle speed detected by the vehicle speed sensor 44 are input to the ECU 40.

The retractor motor 46 rotates the spool 30A in the take-up direction or in the pull-out direction when driven by a signal from the ECU 40. Thus, the webbing 24 is taken up by the retractor 30 or the webbing 24 is pulled out from the retractor 30. The pretensioner 48 forces the spool 30A to rotate in the take-up direction when activated by a signal from the ECU 40.

Figure 4:
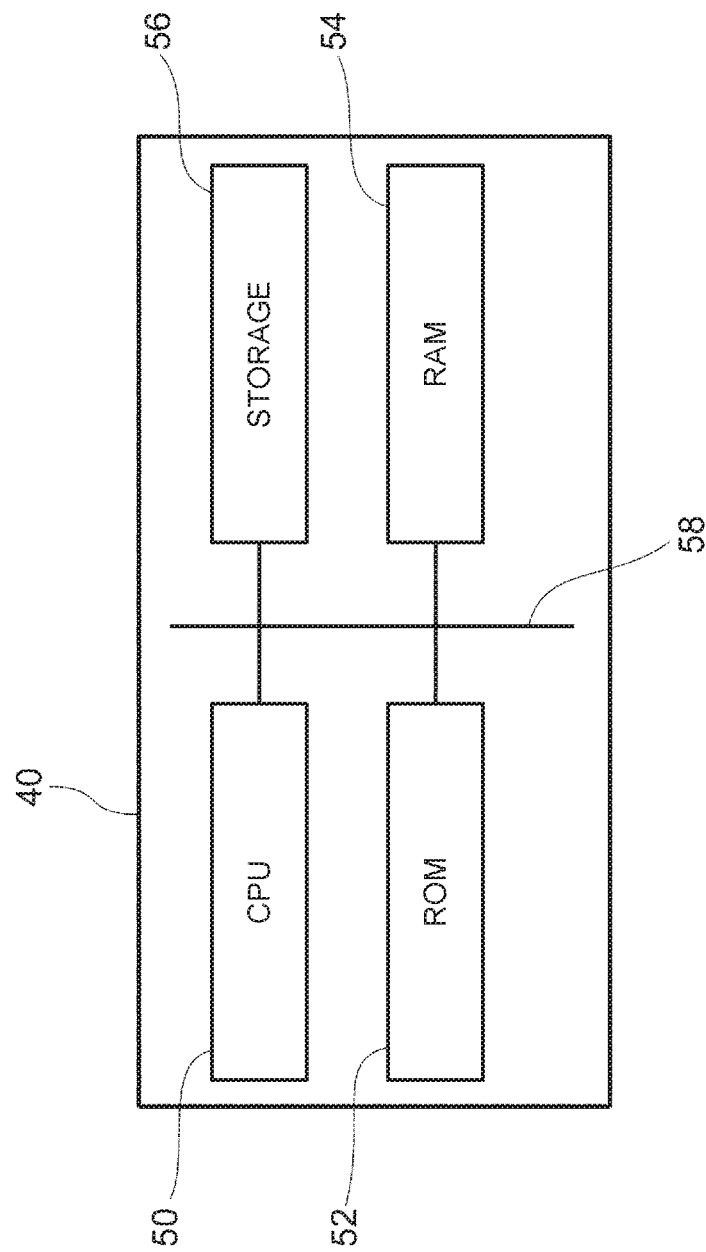
FIG. 4 is a block diagram that shows the hardware configuration of an ECU that is a component of the vehicle occupant restraint system according to the first embodiment.

FIG. 4 is a block diagram that shows the hardware configuration of the ECU 40. As shown in FIG. 4, the ECU 40 includes a central processing unit (CPU) 50 serving as a processor, a read only memory (ROM) 52, a random access memory (RAM) 54, and a storage 56. These components are connected to one another via a bus 58 so as to be communicable.

The CPU 50 is a central processing unit. The CPU 50 runs various programs and controls various units. In other words, the CPU 50 reads out programs from the ROM 52 or the storage 56 and runs the programs by using the RAM 54 as a work area. The CPU 50 executes control over the above-described components and various arithmetic processing in accordance with the programs recorded on the ROM 52 or the storage 56.

The ROM 52 stores various programs and various data. The RAM 54 temporarily stores programs or data as a work area. The storage 56 is a hard disk drive (HDD) or a solid state drive (SSD). The storage 56 stores various programs including an operating system, and various data.

The vehicle occupant restraint system 10 realizes various functions by using hardware resources shown in FIG. 3 and FIG. 4. Functional components that are realized by the vehicle occupant restraint system 10 will be described with reference to FIG. 5.

Figure 5:
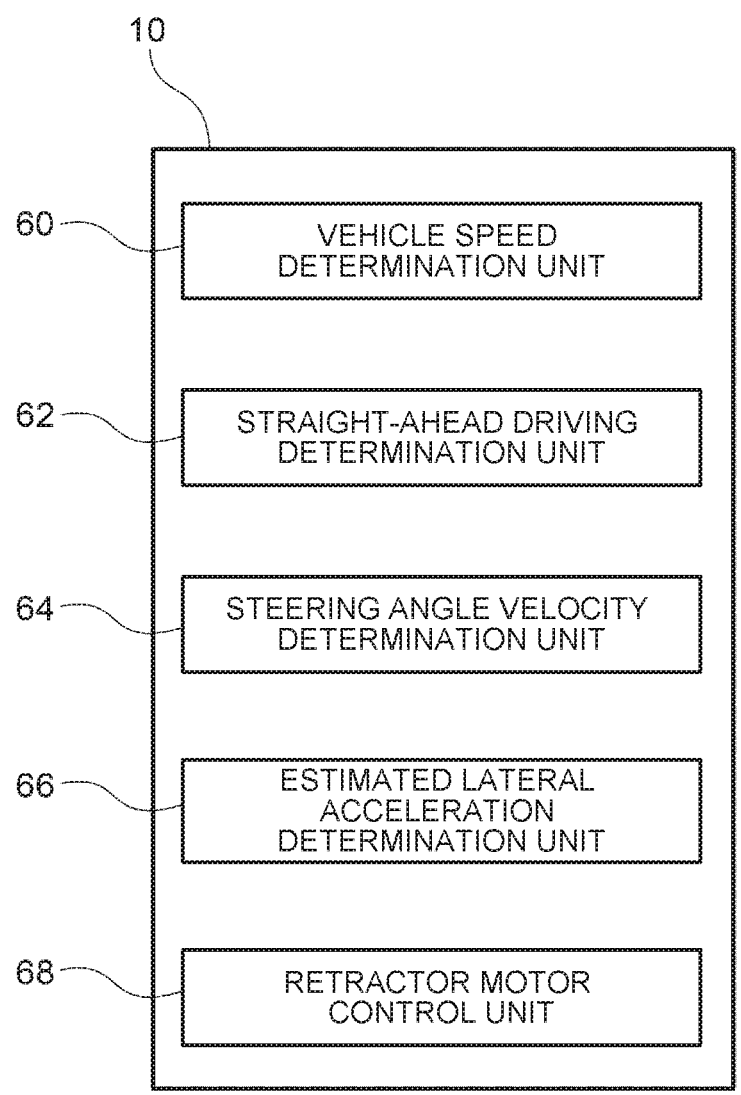
FIG. 5 is a block diagram that shows the functional configuration of the vehicle occupant restraint system according to the first embodiment.

As shown in FIG. 5, the vehicle occupant restraint system 10 includes a vehicle speed determination unit 60, a straight-ahead driving determination unit 62, a steering angle velocity determination unit 64, an estimated lateral acceleration determination unit 66, and a retractor motor control unit 68 as the functional components. The functional components are realized by the CPU 50 of the ECU 40 reading and running programs stored in the ROM 52 or the storage 56.

The vehicle speed determination unit 60 determines whether the vehicle speed of the vehicle 12, detected by the vehicle speed sensor 44, is higher than or equal to a predetermined vehicle speed threshold. The straight-ahead driving determination unit 62 determines whether the vehicle 12 is driving straight ahead. Specifically, the straight-ahead driving determination unit 62 determines whether the absolute value of the steering angle of the steering wheel 36, detected by the steering angle sensor 42, is less than a predetermined threshold (straight-ahead driving threshold). The straight-ahead driving threshold is, for example, set in the range of 30 degrees to 45 degrees.

The steering angle velocity determination unit 64 determines whether a steering angle velocity is higher than or equal to a predetermined steering angle velocity threshold. In the present embodiment, a steering angle velocity is calculated based on the steering angle of the steering wheel 36, detected by the steering angle sensor 42. Specifically, a steering angle velocity is calculated by the differentiation of the steering angle. The steering angle velocity threshold that is used in the steering angle velocity determination unit 64 is set for each vehicle speed (see FIG. 7). Specifically, the steering angle velocity threshold is set so as to increase as the vehicle speed decreases. In addition, the steering angle velocity threshold is set to substantially the same value at or above a predetermined vehicle speed. Furthermore, the steering angle velocity threshold set for each vehicle speed is, for example, set so as to continuously change.

The estimated lateral acceleration determination unit 66 determines whether an estimated lateral acceleration estimated to be applied to the vehicle 12 is higher than or equal to a predetermined acceleration threshold. In the present embodiment, an estimated lateral acceleration is calculated based on the vehicle speed detected by the vehicle speed sensor 44 and the steering angle detected by the steering angle sensor 42. Specifically, where the vehicle speed is V and the steering angle is θ, the estimated lateral acceleration a is calculated by the following mathematical expression (1). It is noted that k is a coefficient that is determined based on the shape of the vehicle 12 and is determined based on, for example, wheel base, or the like.

$$a = V^2 \times \theta \times k \qquad (1)$$

Figure 8:
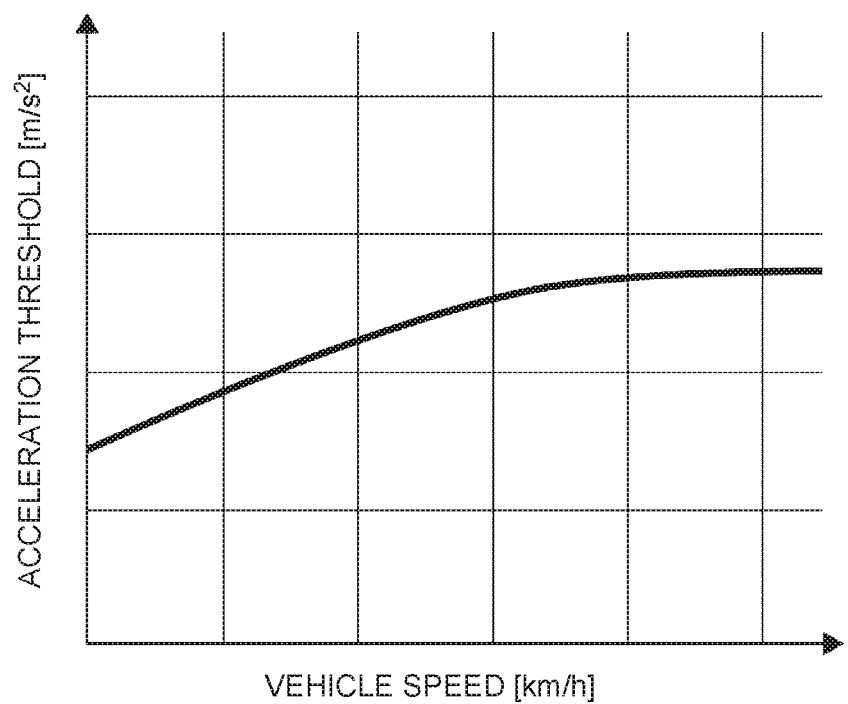
FIG. 8 is a graph that shows the relationship between an acceleration threshold and a vehicle speed in the vehicle occupant restraint system according to the first embodiment.

The acceleration threshold that is used in the estimated lateral acceleration determination unit 66 is set for each vehicle speed (see FIG. 8). Specifically, the acceleration threshold is set so as to decrease as the vehicle speed decreases. In addition, the acceleration threshold is set to substantially the same value at or above a predetermined vehicle speed. Furthermore, the acceleration threshold set for each vehicle speed is, for example, set so as to continuously change.

The retractor motor control unit 68 controls the direction and amount in which the spool 30A is rotated by the retractor motor 46 of the seatbelt device 22.

Next, the flow of an occupant restraining process that the vehicle occupant restraint system 10 executes will be described with reference to the flowchart of FIG. 6. For example, the occupant restraining process is executed by the CPU 50 reading out the program from the ROM 52 or the storage 56, expanding the program on the RAM 54, and running the program.

Figure 6:
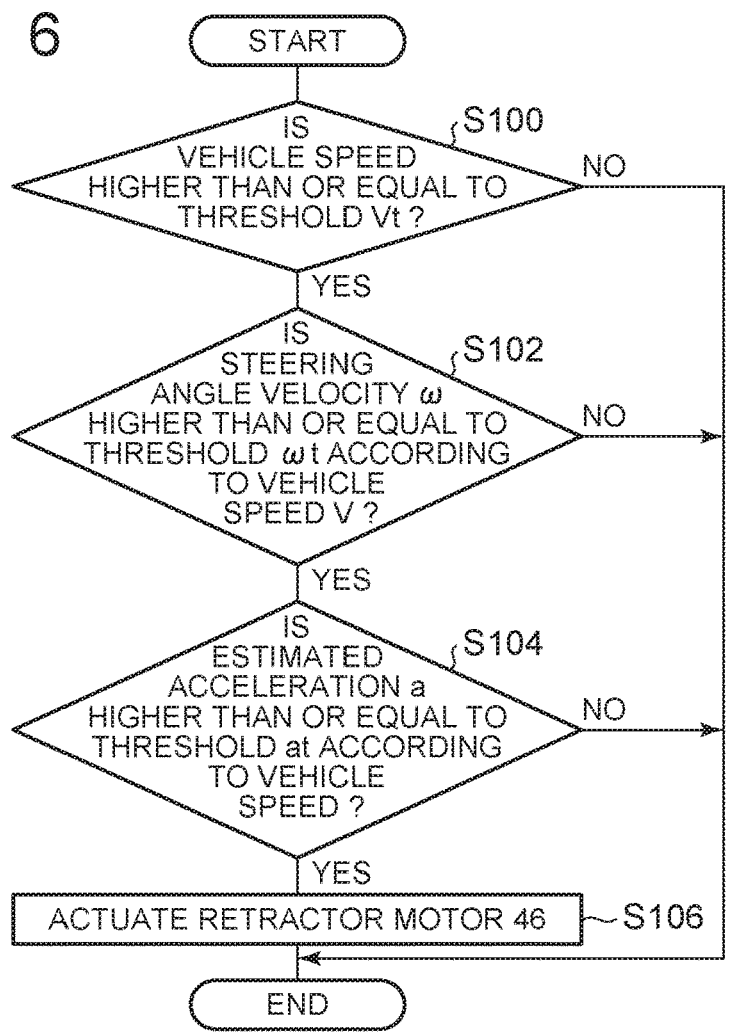
FIG. 6 is a flowchart that shows the flow of an occupant restraining process according to the first embodiment.
Figure 7:
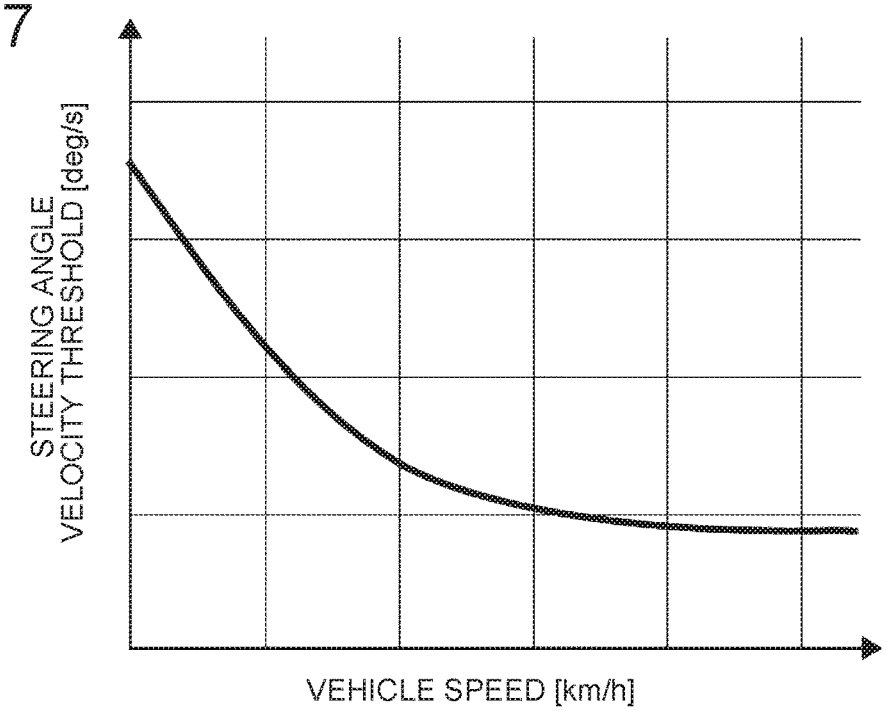
FIG. 7 is a graph that shows the relationship between a steering angle velocity threshold and a vehicle speed in the vehicle occupant restraint system according to the first embodiment.

As shown in FIG. 6, the CPU 50 determines in step S100 whether the vehicle speed V of the vehicle 12, detected by the vehicle speed sensor 44, is higher than or equal to the vehicle speed threshold Vt. The CPU 50 goes to step S102 when the vehicle speed V is higher than or equal to the vehicle speed threshold Vt or ends the process when the vehicle speed V is lower than the vehicle speed threshold Vt.

The CPU 50 determines in step S102 whether the steering angle velocity w calculated from the steering angle θ1 of the steering wheel 36, detected by the steering angle sensor 42, is higher than or equal to the steering angle velocity threshold ωt set for the current vehicle speed V. The CPU 50 goes to step S104 when the steering angle velocity w is higher than or equal to the steering angle velocity threshold ωt or ends the process when the steering angle velocity ω is lower than the steering angle velocity threshold ωt.

The CPU 50 determines in step S104 whether the estimated lateral acceleration a estimated to be applied to the vehicle 12 is higher than or equal to the acceleration threshold at set for the vehicle speed V. The CPU 50 goes to step S106 when the estimated lateral acceleration a is higher than or equal to the acceleration threshold at or ends the process when the estimated lateral acceleration a is lower than the acceleration threshold at. In the present embodiment, the estimated lateral acceleration a is calculated from the mathematical expression (1) based on the vehicle speed V and the steering angle θ1.

The CPU 50 actuates the retractor motor 46 in step S106. The CPU 50 controls the retractor motor 46 with the function of the retractor motor control unit 68 such that the spool 30A is rotated in the take-up direction by a predetermined amount.

As described above, in the occupant restraining process of the present embodiment, when the vehicle speed V is higher than or equal to the vehicle speed threshold Vt, the steering angle velocity ω is higher than or equal to the steering angle velocity threshold ωt, and the estimated lateral acceleration a is higher than or equal to the acceleration threshold at, the webbing 24 is taken up by the predetermined amount. Thus, the tension of the webbing 24 is increased, with the result that the inertial movement of the occupant P is reduced.

Operation and Effects of First Embodiment

Next, the operation and effects of the present embodiment will be described.

In the vehicle occupant restraint system 10 of the present embodiment, as shown in FIG. 1 and FIG. 3, the retractor 30 of the seatbelt device 22 includes the retractor motor 46. When the retractor motor 46 is driven, the spool 30A rotates in the take-up direction, and the webbing 24 is taken up. Thus, when a high acceleration is input to the vehicle 12, the inertial movement of the occupant P is reduced by increasing the tension of the webbing 24.

The vehicle occupant restraint system 10 drives the retractor motor 46 when the vehicle speed V is higher than or equal to the vehicle speed threshold Vt, the steering angle velocity ω is higher than or equal to the steering angle velocity threshold ωt set for each vehicle speed V (see FIG. 7), and the estimated lateral acceleration a is higher than or equal to the acceleration threshold at. In other words, the steering angle velocity threshold ωt set as a condition to drive the retractor motor 46 is set for each vehicle speed V. Therefore, by setting an appropriate steering angle velocity threshold ωt according to the amount of inertial movement of the occupant P in the vehicle width direction, the vehicle occupant restraint system 10 is able to take up the webbing 24 when the occupant P is estimated to move because of inertia by a relatively large amount in the vehicle width direction. The amount of inertial movement varies for each vehicle speed V even at the same steering angle velocity ω. Thus, both comfort and occupant protection performance are achieved.

Since the steering angle velocity threshold ωt is set so as to increase as the vehicle speed V decreases, the retractor motor 46 is driven at a higher steering angle velocity ω when the vehicle speed V is low than when the vehicle speed V is high. Generally, when the vehicle speed V is low, the occupant P is difficult to move because of inertia unless the steering angle velocity ω increases as compared to when the vehicle speed V is high, so the webbing 24 is appropriately taken up according to the amount of inertial movement of the occupant P, which varies with the vehicle speed V.

Furthermore, as shown in FIG. 8, since the acceleration threshold at is set for each vehicle speed V, by setting an appropriate acceleration threshold according to the estimated lateral acceleration a that varies for each vehicle speed V even at the same steering angle, the webbing 24 is taken up when the occupant P is estimated to move because of inertia by a relatively large amount in the vehicle width direction based on the vehicle speed V.

The acceleration threshold at is set so as to decrease as the vehicle speed V decreases. Therefore, when the vehicle speed V is high, the acceleration threshold at increases as compared to when the vehicle speed V is low. Generally, when the vehicle speed V is high, the estimated lateral acceleration a increases even at a small steering angle. Therefore, when the same acceleration threshold at as that when the vehicle speed V is low is set, the estimated lateral acceleration a may easily reach the acceleration threshold at, and the webbing 24 may be taken up. In contrast to this, the acceleration threshold at is set so as to be higher when the vehicle speed V is high than when the vehicle speed V is low. Therefore, immediate taking up of the webbing 24 resulting from slight input of steering at a high vehicle speed V is suppressed. With these configurations, the occupant P is restrained at appropriate timing according to the vehicle speed V.

Second Embodiment

Next, a vehicle occupant restraint system according to a second embodiment will be described with reference to FIG. 9 to FIG. 13. Like reference signs denote similar components to those of the first embodiment, and the description will not be repeated as needed.

The vehicle occupant restraint system 70 of the present embodiment has similar basic components to those of the first embodiment and differs from the that of the first embodiment in that the steering angle velocity threshold and the acceleration threshold are changed at the time when a side slip of the vehicle 12 is detected or predicted.

Figure 9:
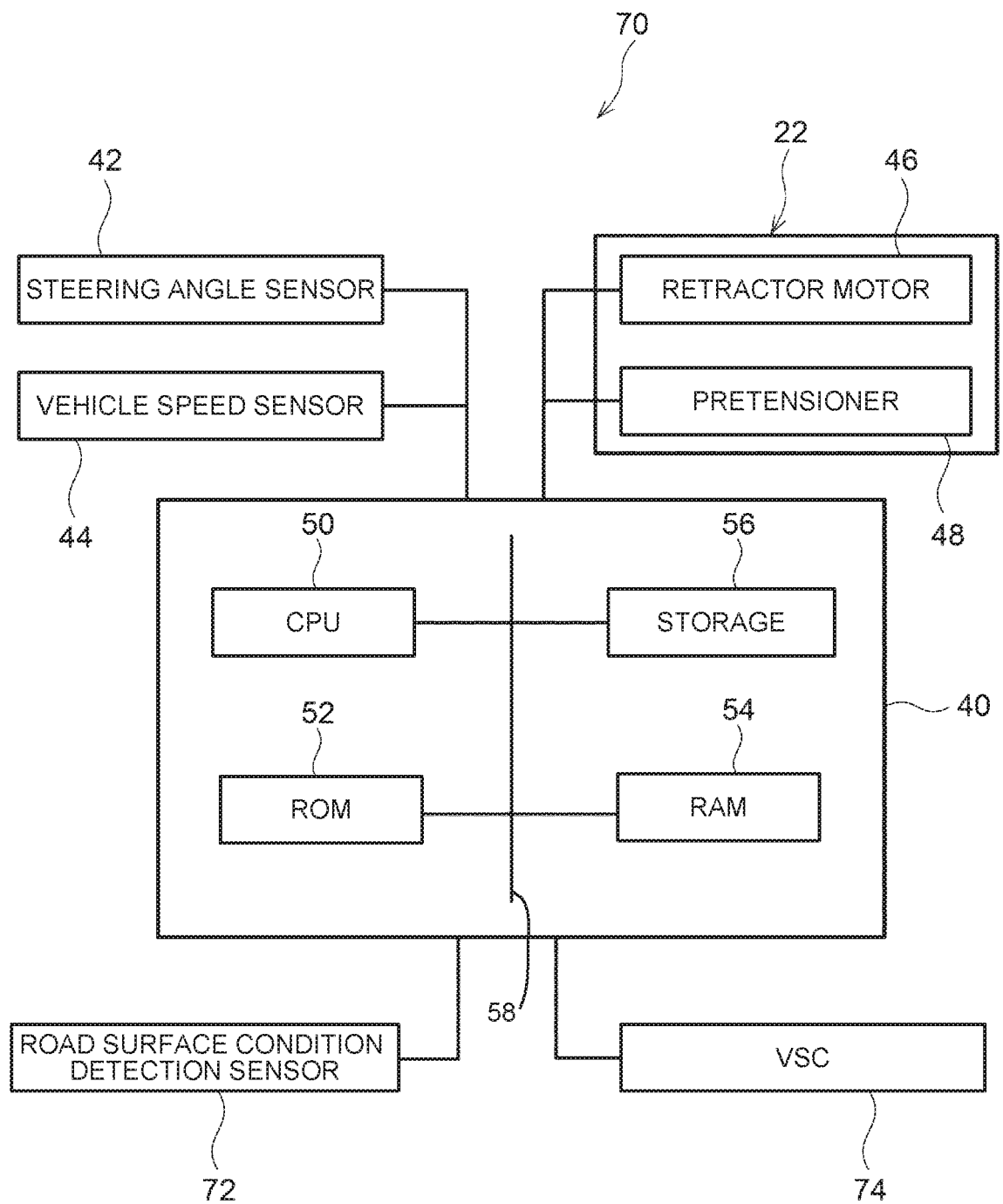
FIG. 9 is a block diagram that shows the hardware configuration of a vehicle occupant restraint system according to a second embodiment.

In other words, as shown in FIG. 9, the ECU 40 of the vehicle occupant restraint system 70 is electrically connected to the steering angle sensor 42, the vehicle speed sensor 44, the retractor motor 46, the pretensioner 48, a road surface condition detection sensor 72, and a vehicle stability control system (hereinafter, simply referred to as "VSC") 74.

The road surface condition detection sensor 72 is a sensor that detects the wet condition, compacted snow condition, frozen condition, and the like, of a road surface.

The VSC 74 controls the rotating force of each wheel according to a yaw rate and a steering angle at the time when a side slip of the vehicle 12 is predicted or detected in order to prevent a side slip, or the like, of the vehicle 12 on a low μ road, or the like.

The vehicle occupant restraint system 70 realizes various functions by using the hardware resources shown in FIG. 9. Functional components that are realized by the vehicle occupant restraint system 70 will be described with reference to FIG. 10.

Figure 10:
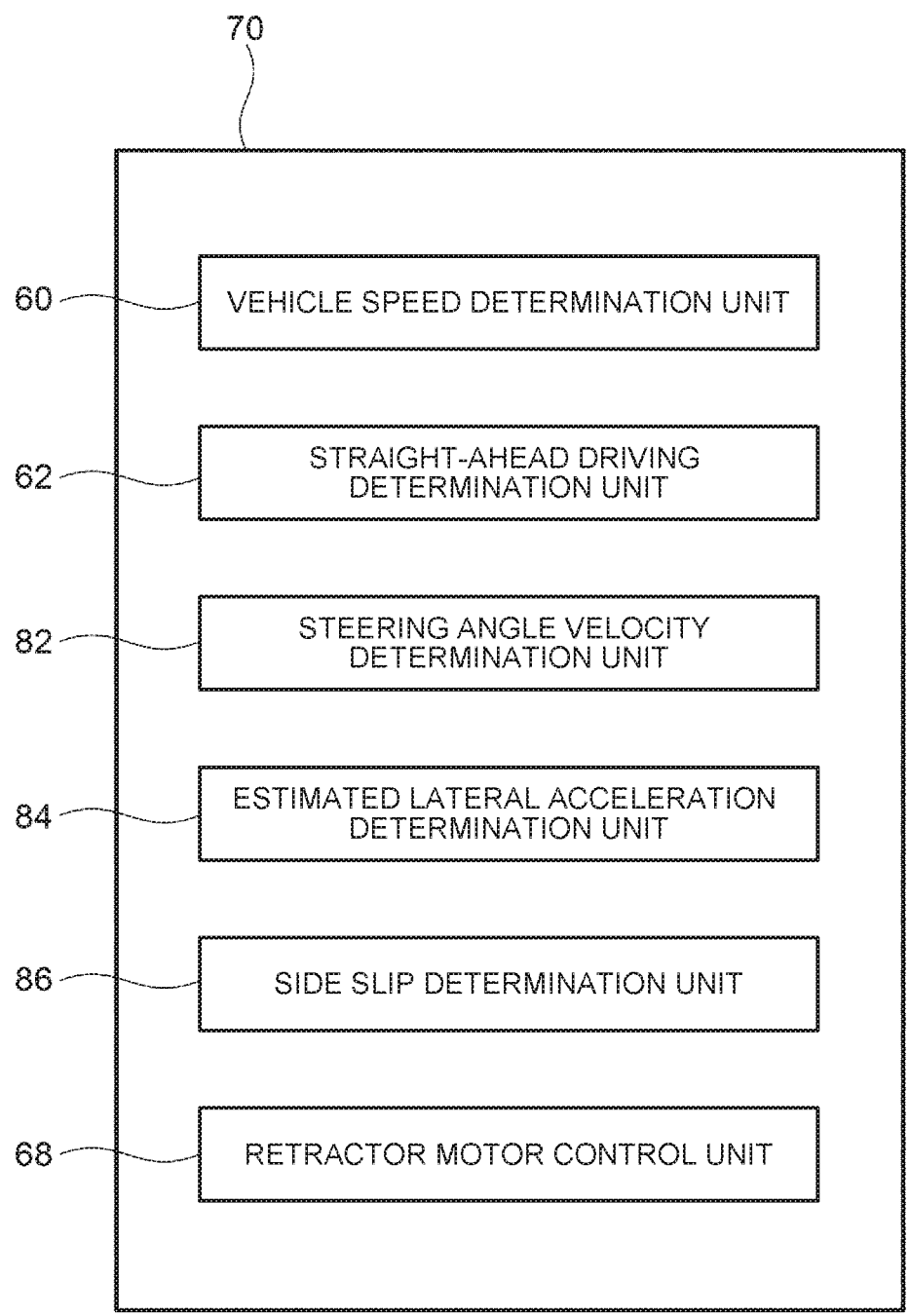
FIG. 10 is a block diagram that shows the functional configuration of the vehicle occupant restraint system according to the second embodiment.

As shown in FIG. 10, the vehicle occupant restraint system 70 includes the vehicle speed determination unit 60, the straight-ahead driving determination unit 62, a steering angle velocity determination unit 82, an estimated lateral acceleration determination unit 84, a side slip determination unit 86, and the retractor motor control unit 68 as the functional components. The functional components are realized by the CPU 50 of the ECU 40 reading and running a side slip program stored in the ROM 52 or the storage 56.

The side slip determination unit 86 predicts in advance or early detects a side slip of the vehicle 12 based on information that is acquired from the road surface condition detection sensor 72 or an activation signal of the VSC 74.

Figure 12:
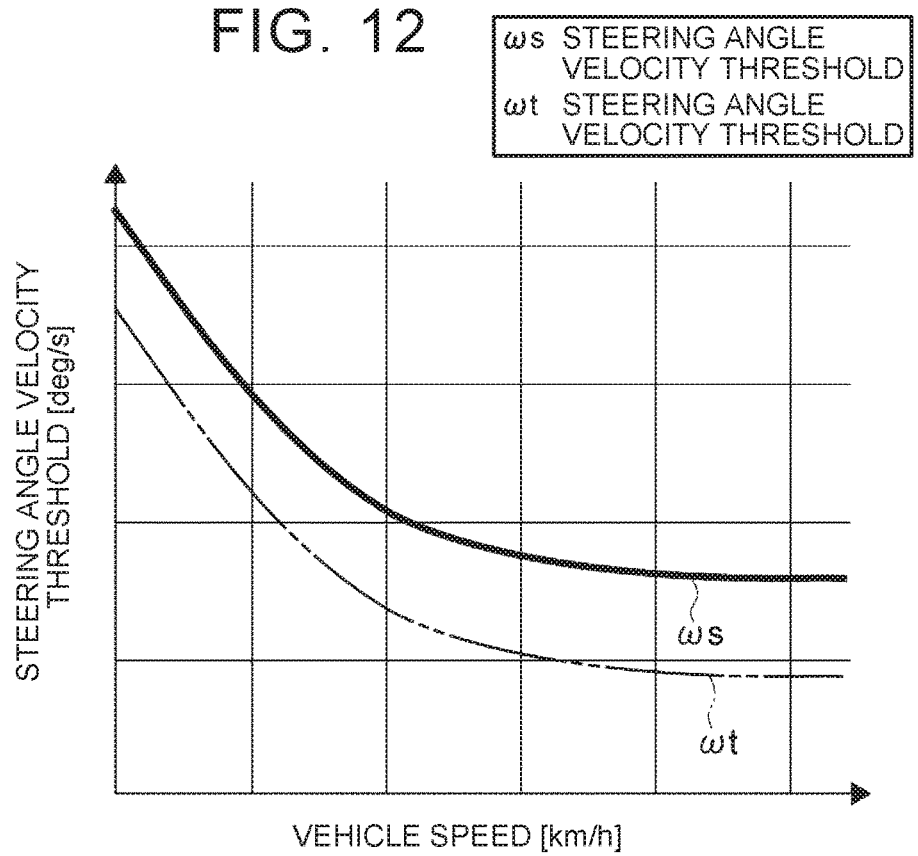
FIG. 12 is a graph that shows the relationship between a steering angle velocity threshold and a vehicle speed in the vehicle occupant restraint system according to the second embodiment.

The steering angle velocity determination unit 82 determines whether a steering angle velocity is higher than or equal to a predetermined steering angle velocity threshold. The steering angle velocity threshold that is used in the steering angle velocity determination unit 82 is set for each vehicle speed (see FIG. 12). Specifically, the steering angle velocity threshold is set so as to increase as the vehicle speed decreases. In addition, the steering angle velocity threshold is set to substantially the same value at or above a predetermined vehicle speed. Furthermore, the steering angle velocity threshold set for each vehicle speed is, for example, set so as to continuously change. Furthermore, when the steering angle velocity determination unit 82 acquires information that a side slip of the vehicle 12 is predicted in advance or detected from the side slip determination unit 86, the steering angle velocity determination unit 82 changes the steering angle velocity threshold such that the steering angle velocity threshold increases. For example, in the present embodiment, as shown in FIG. 12, relative to the steering angle velocity threshold during normal times (see the alternate long and two-short dashed line in the graph), the steering angle velocity threshold for any vehicle speed is increased by a predetermined value (see the continuous line in the graph) at the time when information that a side slip is predicted in advance or detected is acquired. Not limited to this configuration, only the steering angle velocity threshold (s) set for a specific vehicle speed(s) may be increased by a predetermined value.

Figure 13:
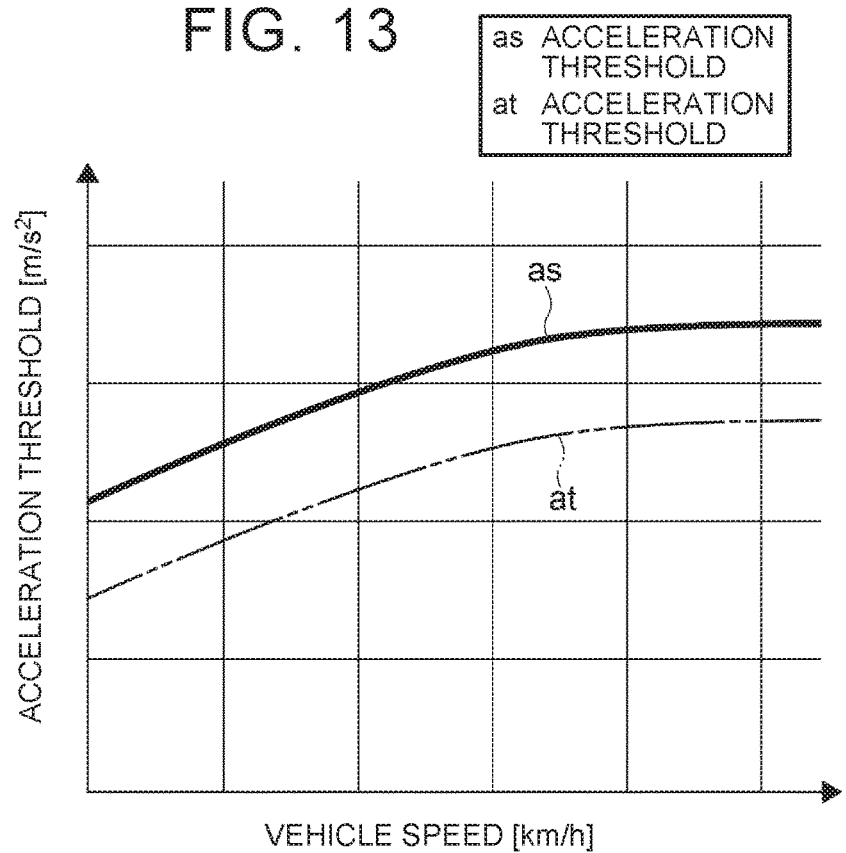
FIG. 13 is a graph that shows the relationship between an acceleration threshold and a vehicle speed in the vehicle occupant restraint system according to the second embodiment.

The estimated lateral acceleration determination unit 84 shown in FIG. 10 determines whether the estimated lateral acceleration estimated to be applied to the vehicle 12 is higher than or equal to a predetermined acceleration threshold. The acceleration threshold that is used in the estimated lateral acceleration determination unit 84 is set for each vehicle speed (see FIG. 13). Specifically, the acceleration threshold is set so as to decrease as the vehicle speed decreases. The acceleration threshold is set to substantially the same value at or above a predetermined vehicle speed. In addition, the acceleration threshold set for each vehicle speed is, for example, set so as to continuously change. Furthermore, when the estimated lateral acceleration determination unit 84 acquires information that a side slip of the vehicle 12 is predicted in advance or detected from the side slip determination unit 86, the estimated lateral acceleration determination unit 84 changes the acceleration threshold such that the acceleration threshold increases. For example, in the present embodiment, as shown in FIG. 13, relative to the acceleration threshold during normal times (see the alternate long and two-short dashed line at in the graph), the acceleration threshold for any vehicle speed is increased by a predetermined value (see the continuous line as in the graph) at the time when information that a side slip is predicted in advance or detected is acquired. Not limited to this configuration, only the acceleration threshold(s) set for a specific vehicle speed(s) may be increased by a predetermined value.

Next, the flow of an occupant restraining process that the vehicle occupant restraint system 70 executes will be described with reference to the flowchart of FIG. 11. For example, the occupant restraining process is executed by the CPU 50 reading out the side slip program from the ROM 52 or the storage 56, expanding the side slip program on the RAM 54, and running the side slip program. Like step numbers denote the same steps as those of the first embodiment, and the description thereof will not be repeated.

Figure 11:
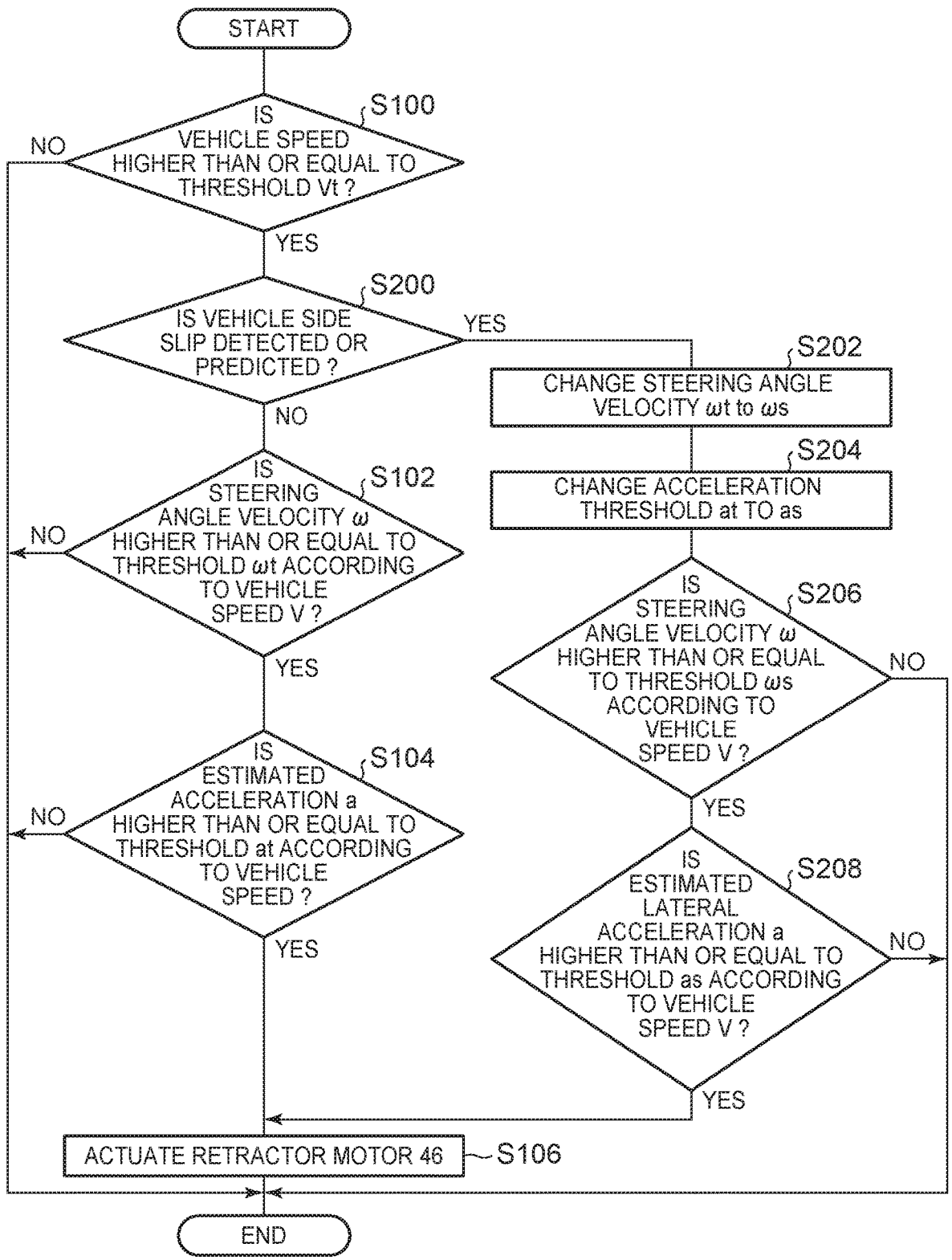
FIG. 11 is a flowchart that shows the flow of a vehicle occupant restraining process according to the second embodiment.

As shown in FIG. 11, the CPU 50 determines in step S100 whether the vehicle speed V of the vehicle 12, detected by the vehicle speed sensor 44, is higher than or equal to the vehicle speed threshold Vt. The CPU 50 goes to step S200 when the vehicle speed V is higher than or equal to the vehicle speed threshold Vt or ends the process when the vehicle speed V is lower than the vehicle speed threshold Vt.

The CPU 50 determines in step S200 whether a side slip of the vehicle 12 is predicted in advance or early detected. The CPU 50 goes to step S202 when a side slip of the vehicle 12 is predicted in advance or early detected, or goes to step S102 when a side slip of the vehicle 12 is not predicted in advance or early detected.

In step S202, the CPU 50 changes the steering angle velocity threshold $\omega t$ to be used for determination in an operation (described later) to the steering angle velocity threshold $\omega s$ (see FIG. 12), and goes to step S204. In step S204, the CPU 50 changes the acceleration threshold at to be used for determination in an operation (described later) to the acceleration threshold as (see FIG. 13), and goes to step S206.

The CPU 50 determines in step S206 whether the steering angle velocity $\omega$ calculated from the steering angle $\theta 1$ of the steering wheel 36, detected by the steering angle sensor 42, is higher than or equal to the steering angle velocity threshold $\omega s$ set for the current vehicle speed V. The CPU 50 goes to step S208 when the steering angle velocity $\omega$ is higher than or equal to the steering angle velocity threshold $\omega s$ or ends the process when the steering angle velocity $\omega$ is lower than the steering angle velocity threshold $\omega s$.

The CPU 50 determines in step S208 whether the estimated lateral acceleration a estimated to be applied to the vehicle 12 is higher than or equal to the acceleration threshold as set for the current vehicle speed V. The CPU 50 goes to step S106 when the estimated lateral acceleration a is higher than or equal to the acceleration threshold as or ends the process when the estimated lateral acceleration a is lower than the acceleration threshold as.

Operation and Effects of Second Embodiment

Next, the operation and effects of the present embodiment will be described.

With the above configuration as well, since the configuration is similar to that of the vehicle occupant restraint system 10 of the first embodiment except for that the steering angle velocity threshold $\omega t$ is changed to the steering angle velocity threshold $\omega s$ and the acceleration threshold at is changed to the acceleration threshold as at the time when a side slip of the vehicle 12 is detected or predicted, similar effects to those of the first embodiment are obtained. In addition, the steering angle velocity threshold $\omega s$ and the acceleration threshold as are increased when a side slip of the vehicle 12 is predicted or detected as compared to the steering angle velocity threshold $\omega t$ and the acceleration threshold at in the other cases. Therefore, immediate taking up of the webbing 24 resulting from the steering angle velocity $\omega$ and the estimated lateral acceleration a easily reaching the steering angle velocity threshold $\omega s$ and the acceleration threshold as at the time of counter-steering of the occupant P because of a side slip is suppressed. Thus, the occupant is restrained at appropriate timing in the event of a side slip of the vehicle 12.

The first and second embodiments are described above; however, the disclosure may be, of course, implemented in various modes without departing from the scope of the disclosure. For example, in the above-described embodiments, as shown in FIG. 1, the retractor 30 serving as the take-up device is provided on the vehicle body side; however, the configuration is not limited thereto. A so-called seat-integrated seatbelt device in which the retractor 30 and the belt guide are provided on the vehicle seat 14 may be employed. In this case, the other end of the webbing 24 is fixed to the vehicle seat 14.

Various processors other than the CPU 50 may execute the processes that the CPU 50 executes in the above-described embodiments by reading software (programs). Examples of the processors in this case include a programmable logic device (PLD) of which the circuit configuration is changeable after production, such as a field-programmable gate array (FPGA), and a dedicated electrical circuit that is a processor having a circuit configuration designed exclusively to execute a specific process, such as an application specific integrated circuit (ASIC). The above-described processes may be executed by one of these various processors or may be executed by a combination of two or more processors of the same type or different types (for example, a plurality of FPGAs, a combination of a CPU and an FPGA, or the like). The hardware structures of these various processors are more specifically electrical circuits made up of combinations of circuit elements, such as semiconductor elements.

In the above-described embodiments, the storage 56 is used as a recording unit; however, the configuration is not limited thereto. For example, a recording medium, such as a compact disk (CD), a digital versatile disk (DVD), and a universal serial bus (USB) memory, may be used as a recording unit.

Furthermore, the steering angle velocity thresholds $\omega t$, $\omega s$ and the acceleration thresholds at, as each are set for each vehicle speed V; however, the configuration is not limited thereto. Either the steering angle velocity thresholds $\omega t$, $\omega s$ or the acceleration thresholds at, as may be set for each vehicle speed V. In the second embodiment, the steering angle velocity threshold $\omega t$ is changed to the steering angle velocity threshold $\omega s$ at the time when a side slip of the vehicle 12 is detected or predicted, and the acceleration threshold at is changed to the acceleration threshold as; however, the configuration is not limited thereto. Only at least one of the steering angle velocity threshold $\omega t$ and the acceleration threshold at may be changed.

The side slip determination unit 86 predicts in advance or early detects a side slip of the vehicle 12 based on information that is acquired from the road surface condition detection sensor 72 or an activation signal of the VSC 74; however, the configuration is not limited thereto The side slip determination unit 86 may be configured to predict in advance or early detect a side slip of the vehicle 12 based on information that is acquired from an acceleration sensor, a brake pressure sensor, a yaw rate sensor, or the like, or an activation signal of a traction control system, an anti-lock brake system, or the like, that controls the rotating force of each wheel by detecting a slip of each wheel.

What is claimed is:

1. A vehicle occupant restraint system for a vehicle, the vehicle occupant restraint system comprising:
    a seatbelt device configured to be able to restrain an occupant seated on a vehicle seat by using a webbing of which one end is wound on a take-up device and the other end is fixed to the vehicle seat or a vehicle body and configured to be able to take up the webbing by driving a motor provided in the take-up device; and
    a controller configured to:
        when a vehicle speed is higher than or equal to a predetermined vehicle speed threshold, a steering angle velocity is higher than or equal to a predetermined steering angle velocity threshold set for each vehicle speed, and an estimated lateral acceleration estimated to be applied to the vehicle is higher than or equal to a predetermined acceleration threshold, take up the webbing by a predetermined amount by driving the motor;
        when a side slip is predicted or detected while the vehicle is running, change the steering angle velocity threshold and the acceleration threshold such that the steering angle velocity threshold and the acceleration threshold become higher than the steering angle velocity threshold and the acceleration threshold when no side slip of the vehicle is predicted or detected.

2. The vehicle occupant restraint system according to claim 1, wherein the controller is configured to increase the steering angle velocity threshold as the vehicle speed decreases.

3. The vehicle occupant restraint system according to claim 1, wherein the controller is configured to set the acceleration threshold for each vehicle speed.

4. The vehicle occupant restraint system according to claim 3, wherein the controller is configured to decrease the acceleration threshold as the vehicle speed decreases.

5. The vehicle occupant restraint system according to claim 1, wherein the estimated lateral acceleration is calculated based on the vehicle speed and a steering angle.

6. The vehicle occupant restraint system according to claim 1, wherein the controller is configured to, when the estimated lateral acceleration estimated to be applied to the vehicle is higher than or equal to a predetermined acceleration threshold set for each vehicle speed, take up the webbing by a predetermined amount by driving the motor.

* * * * *